(12) United States Patent
Fukuma

(10) Patent No.: US 7,292,666 B2
(45) Date of Patent: Nov. 6, 2007

(54) TIME DIFFERENCE ADJUSTMENT CIRCUIT

(75) Inventor: Yasuaki Fukuma, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/384,525

(22) Filed: Mar. 21, 2006

(65) Prior Publication Data

US 2006/0251163 A1   Nov. 9, 2006

(30) Foreign Application Priority Data

Mar. 22, 2005 (JP) ............................. 2005-080880

(51) Int. Cl.
*H04L 7/00* (2006.01)
(52) U.S. Cl. ...................................... 375/358; 327/161
(58) Field of Classification Search ...................... None
See application file for complete search history.

(56) References Cited

U.S. PATENT DOCUMENTS

| 6,059,730 A * | 5/2000 | Miwa et al. ................ 600/443 |
| 6,469,550 B1 * | 10/2002 | Kurd ........................... 327/141 |
| 6,714,483 B2 * | 3/2004 | Minami et al. .............. 367/125 |
| 6,847,692 B2 * | 1/2005 | Tokuhiro ..................... 375/354 |
| 6,865,222 B1 * | 3/2005 | Payne ......................... 375/224 |
| 2003/0043926 A1 * | 3/2003 | Terashima et al. .......... 375/257 |
| 2003/0081709 A1 * | 5/2003 | Ngo et al. ................... 375/362 |
| 2003/0084365 A1 * | 5/2003 | Kubo ........................... 713/500 |

FOREIGN PATENT DOCUMENTS

JP    11-225173    8/1999

* cited by examiner

*Primary Examiner*—Cassandra Cox
(74) *Attorney, Agent, or Firm*—Foley & Lardner LLP

(57) ABSTRACT

In a first stage, each of level detection circuits compares a transmission signal and a first reference voltage Vr1 to detect a rising edge, and phase difference detection circuits detect phase differences between the level detection circuits. In a second stage, each of level detection circuits compares the potential of a signal reflected by a receiving end and a second reference voltage Vr2 to detect a rising edge, and phase difference detection circuits detect phase differences between the level detection circuits, each set of which corresponds to adjacent two transmission lines. Based on both the phase differences, the time instant of arrival of signals is adjusted.

6 Claims, 2 Drawing Sheets

TIME DIFFERENCE ADJUSTMENT CIRCUIT

BACKGROUND OF THE INVENTION

1. Field of the Invention

The present invention relates to a time difference adjustment circuit and, more particularly, to a time difference adjustment circuit that adjusts a difference in signal transmission delay time between a plurality of transmission channels. The present invention also relates to a method for adjusting the time difference.

2. Description of the Related Art

The transmission rate of a communication channel between computers has been dramatically improved. Under such a circumstance that a communication rate has thus been increased, a time difference between signals, which is caused by variations in design and production or a difference in ambient conditions such as an ambient temperature, is recognized as a significant problem during exchanging signals through a plurality of communication channels.

Conventionally, a strict design accuracy standard and strict manufacturing standard have been set for a high-speed communication channel between computers in order to reduce variations in signal transmission time, resulting in an increase of costs. As a method of automatically adjusting a difference in delay time generated in the communication between computers, there is known a method that uses a receiving-side computer for detecting and adjusting the time difference between signals transferred through a plurality of communication channels. However, in the conventional adjustment method, a complicated process is required which includes the steps of feeding-back a signal time difference detected by the receiving-side computer to a transmitting-side computer and adjusting the delay time in a delay circuit of the transmitting-side computer.

Patent Publication JP-11-225173A describes a technique that adjusts a delay time difference between signals without using a feedback signal in a signal transmission system exchanging the signals between computers. This technique includes the step of transmitting, via transmission lines, signals which have been delayed by variable delay circuits from a transmitting side, detecting reflected waves of the transmitting signals, calculating the delay time of the signals to be transmitted via the transmission lines based on the time difference between the signal transmission time and signal detection time on the transmitting side, and adjusting the delay time for the variable delay circuits.

In the technique described in JP-11-225173A, the signal delay time in each of a plurality of transmission lines is compared in the circuit provided for the each of the transmission lines, against a reference (expected) delay time. Therefore, it is necessary to set the reference delay time in a LSI for each transmission line or otherwise, to supply the reference delay time from outside. Further, variation in the reference delay time occurs in each circuit. Therefore, there is a question as to whether the above technique can measure an effective delay time in a high-speed transmission line.

SUMMARY OF THE INVENTION

In view of the above situation in the conventional technique, it is an object of the present invention to provide a time difference adjustment circuit which is capable of adjusting a signal time difference between a plurality of communication channels without the need to set a reference time in a LSI or to input the reference time from outside, and without the need to use a feedback signal transferred between the transmitting side and the receiving side.

It is also an object of the present invention to provide a method for adjusting the time difference between communication channels.

The present invention provides, in a first aspect thereof, a time difference adjustment circuit for use in a signal transmission system including a transmitting circuit and a receiving circuit for exchanging therebetween a plurality of signals through respective transmission lines, the time difference adjustment circuit including: a signal detecting circuit for detecting, at the transmitting circuit, two reflected waves of a first signal transmitted from the receiving circuit through respective two of the transmission lines and reflected by the signal receiving circuit through the respective two of the transmission lines; a phase difference detecting circuit for detecting a phase difference between the two reflected waves; and a variable-delay circuit for delaying at least one of two second signals to be transmitted from the transmitting circuit through the respective two of the transmission lines based on the phase difference detected by the phase difference detecting circuit.

The present invention provides, in a second aspect thereof, a time difference adjustment circuit for use in a signal transmission system including a transmitting circuit and a receiving circuit for exchanging therebetween a plurality of signals through respective transmission lines, the time difference adjustment circuit including: a signal detecting circuit for detecting, at the transmitting circuit, first and second signals to be transmitted through respective two of the transmission lines and first and second reflected waves of the first and second signals reflected by the signal receiving circuit through the respective two of the transmission lines; a phase difference detecting circuit for detecting a first phase difference between the first signal and the second signal and a second phase difference between the first reflected wave and the second reflected wave; and a variable-delay circuit for delaying at least one of third and fourth signals to be transmitted from the transmitting circuit through the respective two of the transmission lines based on the first and second phase differences.

The present invention provides, in a third aspect thereof, a method for adjusting a time difference in a signal transmission system including a transmitting circuit and a receiving circuit for exchanging therebetween a plurality of signals through respective transmission lines, the method including: detecting, at the transmitting circuit, two reflected waves of a first signal transmitted from the receiving circuit through respective two of the transmission lines and reflected by the signal receiving circuit through the respective two of the transmission lines; detecting a phase difference between the two reflected waves; and delaying at least one of two second signals to be transmitted from the transmitting circuit through the respective two of the transmission lines with a variable delay time based on the phase difference detected in the phase difference detecting step.

The present invention provides, in a fourth aspect thereof, a method for adjusting a time difference in a signal transmission system including a transmitting circuit and a receiving circuit for exchanging therebetween a plurality of signals through respective transmission lines, the method including: detecting, at the transmitting circuit, first and second signals to be transmitted through respective two of the transmission lines and first and second reflected waves of the first and second signals reflected by the signal receiving circuit through the respective two of the transmission lines; detecting a first phase difference between the first signal and the second signal and a second phase difference between the first reflected wave and the second reflected wave; and delaying at least one of third and fourth signals to be transmitted from the transmitting circuit through the respective two of the transmission lines with a variable delay time based on the first and second phase differences.

In accordance with the signal adjusting circuit and method of first and third aspect of the present invention, the reflected waves of a first signal which is transmitted from the transmitting circuit and reflected by the receiving circuit are used to detect a phase difference between the reflected waves transmitted by the two transmission lines. The time difference between the reflected waves generated in the transmission lines is calculated based on the phase difference between the reflected waves. Based on the calculation result, the delay time in the transmitting circuit is adjusted by delaying at lease one of the reflected waves by using a variable delay circuit. With the above configuration, it is possible to reduce the time difference between signals on a plurality of channels without using a feedback signal and without the need to input a reference delay time from outside.

Further, in accordance with the time difference adjustment circuit and method of the second and fourth aspects of the present invention, the first phase difference between the first signal and the second signal as well as the second phase difference between the first reflected wave and the second reflected wave is detected, whereby the delay time can be adjusted based on the first and second phase difference, and thus a further reduction of the time difference can be obtained between the third signal and fourth signal to be transmitted through the transmission lines.

DETAILED DESCRIPTION OF THE PREFERRED EMBODIMENTS

Figure 1:
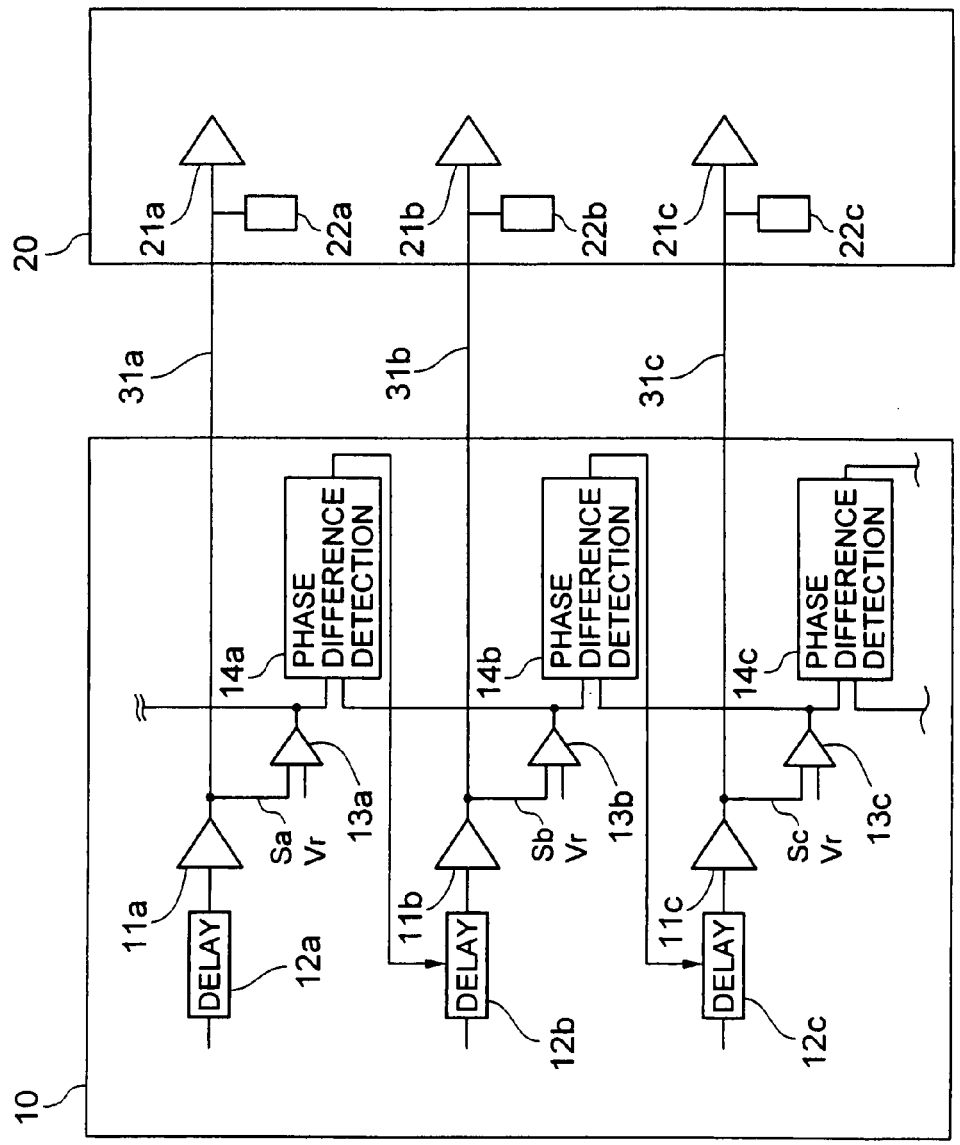
FIG. 1 is a block diagram showing a time difference adjustment circuit according to an embodiment of the present invention.

An embodiment of the present invention will now be described below with reference to the accompanying drawings. FIG. 1 shows a computer system having a time difference adjustment circuit according to an embodiment of the present invention. The computer system includes a transmitting-side computer, a receiving-side computer, and a plurality of transmission lines configuring a plurality of communication channels between the transmitting-side computer and the receiving-side computer. Although FIG. 1 shows only a set of a transmitting circuit 10 of the transmitting-side computer and a receiving circuit 20 of the receiving-side computer for the sake of simplification, each of the transmitting-side and receiving-side computers actually has both the transmitting circuit 10 and receiving circuit 20. Further, of a large number of transmission lines actually provided in the computer system, FIG. 1 shows circuit configurations for only three transmission lines 31a, 31b, and 31c.

The transmitting circuit 10 includes, for respective transmission lines 31a, 31b, 31c . . . , delay adjustment circuits 12a, 12b, 12c . . . which provide variably adjustable delays to transmission signals, transmission buffers (output buffers) 11a, 11b, 11c . . . each having an input connected to the output side of a corresponding one of the delay adjustment circuits 12a, 12b, 12c, level detection circuits 13a, 13b, 13c . . . each for comparing the amplitude of each of the transmission lines 31a, 31b, 31c connected to the outputs of the output buffers 11a, 11b, 11c . . . against a reference potential, and phase difference detection circuits 14a, 14b, 14c . . . each for comparing the rising edge of the output of each of the level detection circuits 13a, 13b, 13c . . . against the rising edge of the adjacent level detection circuit 13b, 13c . . . . The receiving circuit 20 includes, for respective transmission lines 31a, 31b, 31c . . . , input buffers 21a, 21b, 21c . . . and receiving-end termination circuits 22a, 22b, 22c . . . .

Outputs of the phase difference detection circuits 14a, 14b, 14c . . . are input to the adjacent delay adjustment circuits 12b, 12c . . . as delay time control signals for the adjacent delay adjustment circuits 12b, 12c . . . . A first reference potential Vr1 and a second reference potential Vr2 that is higher than the first reference potential Vr1 are sequentially input to the level detection circuits 13a, 13b, 13c . . . . The level detection circuits 13a, 13b, 13c . . . consecutively supply comparison results obtained using the reference potentials to the inputs of the corresponding detection circuits 14a, 14b, 14c . . . .

Operation of the time difference adjustment circuit of FIG. 1 will be described hereinafter. In the following description, a set of first transmission line 31a and a second transmission line 31b is exemplified as a target of the time difference adjustment in the adjacent two transmission lines. As a first stage operation, the level detection circuit 13a belonging to the first transmission line 31a compares the signal potential of a detection target signal Sa at the time of transmission against the reference potential Vr1 and supplies the comparison result to one of the inputs of the phase difference detection circuit 14a. Next, as a second stage operation, the level detection circuit 13a compares the signal potential of the reflected wave of the detection target signal Sa against the reference potential Vr2. The signal potential is detected when the signal Sa transmitted via the transmission line 31a and reflected by the input buffer 21a of the receiving circuit 20 of the receiving-side computer is returned via the same transmission line 31a. The comparison result is input to one of the inputs of the phase difference detection circuit 14a as in the first stage.

Similarly, the level detection circuit 13b belonging to the second transmission line 31b compares the signal potential of a detection target signal Sb at the time of transmission against the reference potential Vr1 and supplies the comparison result to one of the inputs of the phase difference detection circuit 14a, as a first stage operation. Next, as a second stage operation, the level detection circuit 13b compares the signal potential of the reflected wave of the detection target signal Sb against the reference potential Vr2. The signal potential is detected when the signal Sb transmitted via the transmission line 31b and reflected by the input buffer 21b is returned via the same transmission line 31b.

The phase difference detection circuit 14a detects a phase difference between the first stage output of the level detection circuit 13a and that of the level detection circuit 13b and detects a phase difference between the second stage output of the level detection circuit 13a and that of the level detection circuit 13b. The phase difference detection circuit 14a then calculates the delay time difference between the input buffers 21a and 21b based on the detection results. The delay adjustment circuit 12b uses the calculation result from the phase difference detection circuit 14a to adjust the variable delay time for a data signal to be transmitted through the transmission line 31b. The above operation is performed between the n-th signal transmission line and the (n+1)-th signal transmission line, where n is an integer satisfying the relationship $1 \leqq n \leqq N$, given N being the number of signal transmission lines disposed between the computers.

Figure 2:
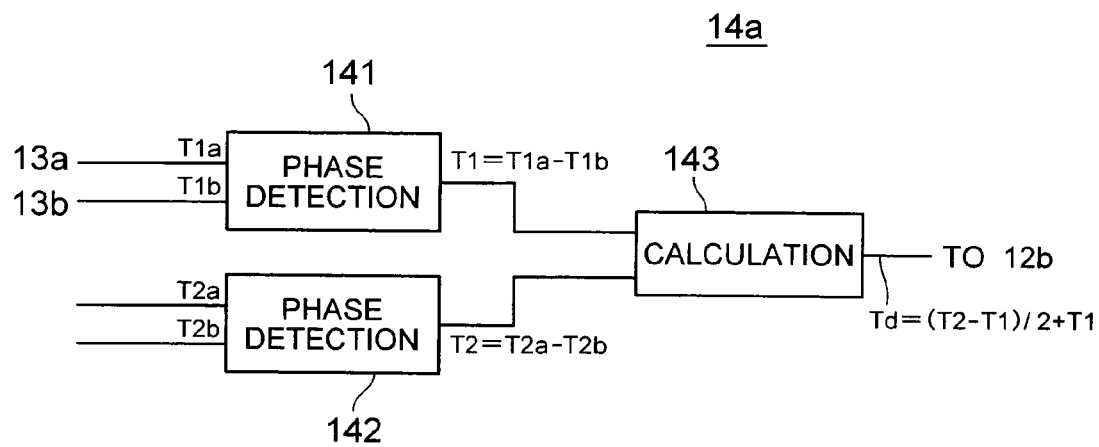
FIG. 2 is a block diagram showing a phase difference detector of FIG. 1.

FIG. 2 shows a detailed configuration of the phase difference detection circuit 14a shown in FIG. 1. Other phase difference detection circuits 14b, 14c . . . have a similar configuration. In FIG. 2, a phase detector 141 detects a phase difference (T1=T1a–T1b) between the first stage output of the level detection circuit 13a and first stage output of the level detection circuit 13b. A phase detector 142 detects a phase difference (T2=T2a–T2b) between the second stage output of the level detection circuit 13a and second stage output of the level detection circuit 13b. A calculation unit 143 performs predetermined calculation using the results from the phase detectors 141 and 142 to obtain a delay time adjustment amount (Td=T1+(T2–T1)/2) and output this calculation result to the delay adjustment circuit 12b.

As described above, the calculation unit 143 calculates the delay time difference between signals, which is caused at the time when the signals transmitted through the transmission lines 31a and 31b arrive at the receiving circuit, based on the results obtained by the phase detectors 141 and 142 and supplies the calculation result to the delay adjustment circuit 12b shown in FIG. 1 as a delay time adjustment amount. The delay adjustment circuit 12b adjusts the delay time of a signal to be transmitted through the transmission line 31b by the supplied delay time adjustment amount (Td=T1+(T2–T1)/2).

Figure 3:
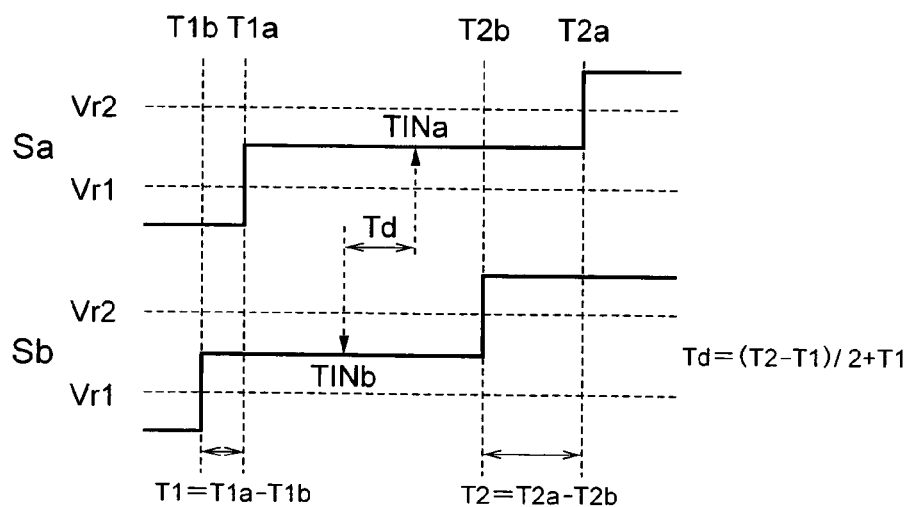
FIG. 3 is a time chart showing a change in input amplitude in a level detection circuit of FIG. 1.

FIG. 3 shows a change in the input amplitude which is caused at the time of level detection in the level detection circuits 13a, 13b, 13c . . . . In FIG. 3, the time instant at which a signal transmitted from the transmitting circuit 10 through the transmission line 31a has arrived at the input buffer 21a of the receiving circuit 20 is a time instant (TINa) corresponding to ½ of the time length between signal change time T1a when a signal is transmitted and a signal change time T2a when the reflected wave of the signal is returned. Similarly, the time instant at which a signal transmitted from the transmitting circuit 10 through the transmission line 31b has arrived at the input buffer 21b of the receiving circuit 20 is a time instant (TINB) corresponding to ½ of the time length between the time instant T1b of signal change at which a signal is transmitted and the time instant T2b of signal change at which the reflected wave of the signal is returned.

Accordingly, the phase difference Td between the signals that have arrived at the receiving circuit via the respective transmission lines is represented by Td=TINa–TINb, and Td=T1+(T2–T1)/2 is obtained from FIG. 3. Provision of this delay time to the signal transmitted through the second transmission line 31b allows the signals Sa and Sb to be input to the respective input buffers of the receiving circuit 20 simultaneously. As a result, the difference of arrival time between a plurality of signals will be substantially zero.

The level detection circuit and delay adjustment circuit shown in FIG. 1 and phase detector and calculation unit shown in FIG. 2 are well known by those skilled in the art, and thus the description of detailed configurations thereof are omitted herein.

In a concrete example, assuming that the maximum amplitude in the small amplitude signal of a LSI is 1V, about 0.75V and 0.25V are used as Vr2 and Vr1, respectively. In general, it is preferable that Vr2 be about ¾ of the maximum amplitude and Vr1 be about ¼ of the maximum amplitude. It is to be noted that, in consideration of the general detection accuracy of the level detection circuit, which is around ± several tens of mV, it is desirable that the voltage difference between Vr1 and Vr2 (Vr2–Vr1) be more than 100 mV.

The adjustment of the delay time in the time difference adjustment circuit according to the embodiment is performed as follows. Firstly, in FIG. 1, the transmitting-side computer transmits signals that rise simultaneously to the transmission lines 31a and 31b. The signal transmitted through the transmission line 31a is also supplied to the level detection circuit 13a as a detection signal Sa and, as a first stage operation, the signal is supplied to the phase difference detection circuit 14a at the time instant T1a when the signal potential of the signal Sa before the transmission exceeds the reference potential Vr1. Similarly, the signal transmitted through the transmission line 31b is also supplied to the level detection circuit 13b as a detection signal Sb and, as a first stage operation, the signal is supplied to the phase difference detection circuit 14a at the time instant T1b when the signal potential of the signal Sb before the transmission exceeds the reference potential Vr1.

The rising signals transmitted via the transmission lines 31a and 31b are reflected by input terminals of the input buffers 21a and 21b of the receiving circuit 20 of the receiving-side computer and returned to the transmitting circuit 10 after the round-trip time for respective transmission lines 31a and 31b. It is to be noted however that, in the case where a transmission scheme other than a transmitting-end termination scheme (series termination scheme) is adopted, a reflected wave is not generated on the receiving circuit side. In the case where a receiving-end termination scheme (parallel termination scheme) is adopted, a commonly-used control signal for a LSI is used to disconnect the receiving-end circuits 22a and 22b of the input buffers only during the adjustment time to deliberately generate reflected waves.

The reflected wave generated on the transmission line 31a is supplied to the level detection circuit 13a as a detection signal Sa and, in a second stage operation, the signal transmitted from the transmitting-end computer is supplied to the phase difference detection circuit 14a at the time (T2a) when the signal potential of the reflected wave of the signal Sa exceeds the reference potential Vr2. Similarly, the reflected wave generated on the transmission line 31b is supplied to the level detection circuit 13b (detection signal Sb) and, in a second stage operation, the signal transmitted from the transmitting-end computer is supplied to the phase difference detection circuit 14a at the time (T2b) when the signal potential of the reflected wave of the signal Sb exceeds the reference potential Vr2. The above operation is sequentially performed for all the transmission lines between the subject transmission line and an adjacent next sequential-order transmission line.

The time difference adjustment circuit according to the above embodiment achieves the following advantages.

A first advantage is that by calculating in the transmitting circuit the delay time difference in the time instant of signal arrival at the receiving circuit using reflected waves to adjust the delay time, it is possible to automatically reduce the delay time difference between signals on a plurality of channels without using a feedback signal.

A second advantage is that by using the reflected waves as well as the delay time difference between signals on a plurality of channels at the time of transmission for the detection and calculation, it is possible to reduce the delay time difference caused by variations in design and production of a transmitting circuit or a delay time difference in the environment such as an ambient temperature.

A third advantage is that a reference delay time is not used in the computer system, thereby eliminating the need to set such a reference time in a LSI or to supply the reference time from outside, or to estimate an error due to a variation in the reference time set for each transmission line.

As another embodiment of the present invention which has a basic configuration similar to that described above, such a modification may be possible in which, only the delay time difference at the time of transmission is firstly adjusted between signals on a plurality of channels to reduce the delay time difference at the time of transmission and, thereafter only the phase difference in the reflected wave is adjusted between signals on a plurality of channels, to thereby reduce the delay time difference between transmission lines. This modification can simplify the arithmetic expression to thereby simplify the configuration of the calculation unit.

In the above modification, upon adjusting the delay time difference between signals on a plurality of channels, the delay time of the signal to be transmitted through the transmission line 31a may have variation in the vicinity of the maximum time limit within which the delay adjustment can be made. This may render the adjustment of the delay time between the signals impossible. In order to solve this problem, another embodiment of the present invention may be employed wherein an alarm is allowed to occur at the time if the time difference between signals cannot be adjusted. In this case, the delay time of a signal to be transmitted through the transmission line 31a is set as a reference time, about the center of the time range in which the delay adjustment can be made, and the delay time adjustment is performed once again.

Further, a differentiating circuit may be adopted in place of the one of the first and second reference potentials of the level detection circuit. It is preferable to use the differentiating circuit for the detection of a reflected wave which is performed in the second stage. In this case, the differentiating circuit is activated after the voltage of a signal has reached Vr1 in the first stage. If the differentiating circuit is adopted, it is necessary to take influence of the differentiating circuit to the transmission line into consideration.

The time difference adjustment circuit according to the present invention is suitably applied to compensation of a time difference in a communication between computers, as well as to the case where a difference in the delay time of a LSI, a printed circuit board that configures a transmission line, or cable is to be compensated. Further, it is suitably applicable to the case where allowance of the delay time difference between signals is extremely small so that an extremely fine adjustment is required, or that the product yield is adversely affected.

Although the present invention has been described with reference to preferred embodiments, the time difference adjustment circuit according to the present invention is not limited to the configurations shown in the above embodiments and various changes, modifications, or alternations to the invention as described herein may be made, none of which depart from the spirit of the present invention. All such changes, modifications, and alternations should therefore be regarded to fall within the scope of the present invention.

What is claimed is:

1. A time difference adjustment circuit for use in a signal transmission system including a transmitting circuit and a receiving circuit for exchanging therebetween a plurality of signals through respective transmission lines, said time difference adjustment circuit comprising:
    a signal detecting circuit for detecting, at the transmitting circuit, two reflected waves of a first signal transmitted from the receiving circuit through respective two of the transmission lines and reflected by the signal receiving circuit through respective said two of the transmission lines;
    a phase difference detecting circuit for detecting a phase difference between said two reflected waves; and
    a variable-delay circuit for delaying at least one of two second signals to be transmitted from the transmitting circuit through respective said two of the transmission lines based on said phase difference detected by said phase difference detecting circuit.

2. The time difference adjusting circuit according to claim 1, wherein said phase detecting circuit detects another phase difference between a phase of said first signal at a transmitting end of one of said two of the transmission lines and a phase of said first signal at a transmitting end of the other of said two of the transmission lines, and said variable delay circuit delays said at least one of two second signals based further on said another phase difference.

3. A time difference adjustment circuit for use in a signal transmission system including a transmitting circuit and a receiving circuit for exchanging therebetween a plurality of signals through respective transmission lines, said time difference adjustment circuit comprising:
    a signal detecting circuit for detecting, at the transmitting circuit, first and second signals to be transmitted through respective two of the transmission lines and first and second reflected waves of said first and second signals reflected by the signal receiving circuit through respective said two of the transmission lines;
    a phase difference detecting circuit for detecting a first phase difference between said first signal and said second signal and a second phase difference between said first reflected wave and said second reflected wave; and
    a variable-delay circuit for delaying at least one of third and fourth signals to be transmitted from the transmitting circuit through respective said two of the transmission lines based on said first and second phase differences.

4. A method for adjusting a time difference in a signal transmission system including a transmitting circuit and a receiving circuit for exchanging therebetween a plurality of signals through respective transmission lines, said method comprising:
    detecting, at the transmitting circuit, two reflected waves of a first signal transmitted from the receiving circuit through respective two of the transmission lines and reflected by the signal receiving circuit through respective said two of the transmission lines;
    detecting a phase difference between said two reflected waves; and
    delaying at least one of two second signals to be transmitted from the transmitting circuit through respective said two of the transmission lines with a variable delay time based on said phase difference detected in said phase difference detecting step.

5. The method according to claim 4, further comprising detecting another phase difference between a phase of said first signal at a transmitting end of one of said two of the transmission lines and a phase of said first signal at a transmitting end of the other of said two of the transmission lines, wherein said delaying delays said at least one of two second signals based further on said another phase difference.

6. A method for adjusting a time difference in a signal transmission system including a transmitting circuit and a receiving circuit for exchanging therebetween a plurality of signals through respective transmission lines, said method comprising:

detecting, at the transmitting circuit, first and second signals to be transmitted through respective two of the transmission lines and first and second reflected waves of said first and second signals reflected by the signal receiving circuit through respective said two of the transmission lines;

detecting a first phase difference between said first signal and said second signal and a second phase difference between said first reflected wave and said second reflected wave; and delaying at least one of third and fourth signals to be transmitted from the transmitting circuit through respective said two of the transmission lines with a variable delay time based on said first and second phase differences.

* * * * *